(12) United States Patent
Muller et al.

(10) Patent No.: US 12,235,801 B2
(45) Date of Patent: Feb. 25, 2025

(54) DENORMALIZED DATA OBJECT HAVING SUPPLEMENTAL ATTRIBTUES FOR CORE DATA MODEL OBJECTS

(71) Applicant: SAP SE, Walldorf (DE)

(72) Inventors: Andre Muller, Speyer (DE); Caetano Plentz Wecker, Novo Hamburgo (BR); Cristian Zaparoli, Novo Hamburgo (BR); Eder Vinicius Soares Costa Albano, Foz do Iguacu (BR); Felipe Martim Souza, Sapucaia do Sul (BR); Maicon Jose Bauermann, Novo Hamburgo (BR); Milene Martini Petry, São Leopoldo (BR); Renato Santos Dielle, São Leopoldo (BR); Thiago Bohn, Novo Hamburgo (BR); Thiago Yves Rosa da Silva, Gravatai (BR)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/099,081

(22) Filed: Jan. 19, 2023

(65) Prior Publication Data
US 2024/0248880 A1 Jul. 25, 2024

(51) Int. Cl.
*G06F 7/00* (2006.01)
*G06F 16/17* (2019.01)
*G06F 16/2455* (2019.01)

(52) U.S. Cl.
CPC ...... *G06F 16/173* (2019.01); *G06F 16/24558* (2019.01)

(58) Field of Classification Search
CPC .......... G06F 16/173; G06F 16/24558; G06F 16/212; G06F 16/28; G06F 16/288
See application file for complete search history.

(56) References Cited

U.S. PATENT DOCUMENTS

| | | | | |
|---|---|---|---|---|
| 5,576,965 | A * | 11/1996 | Akasaka | G06Q 30/016 |
| | | | | 705/304 |
| 7,100,195 | B1 * | 8/2006 | Underwood | H04L 63/0823 |
| | | | | 707/999.009 |
| 7,483,915 | B2 * | 1/2009 | Thompson | G06F 16/289 |
| 7,664,729 | B2 * | 2/2010 | Klein | H04L 41/024 |
| | | | | 707/693 |
| 11,868,372 | B1 * | 1/2024 | Kalki | G06F 16/283 |
| 2003/0105687 | A1 * | 6/2003 | Bross | G06Q 40/02 |
| | | | | 705/31 |

(Continued)

*Primary Examiner* — Mohammed R Uddin
(74) *Attorney, Agent, or Firm* — Klarquist Sparkman, LLP

(57) ABSTRACT

The present disclosure provides techniques and solutions for storing data in a way that facilitates the update and creation of data models, as well as conserving computing resources when accessing such data. A number of data objects can be included in a data model, such as a core data model that can be used in various jurisdictions. A supplemental data object is created that includes data relevant to data objects in the data model. For example, the supplemental data object can include localization attributes. The supplemental data object can be considered as denormalized. A request for data can retrieve data from a data object in the data model, as well as data in the supplemental data object. Different sets of attributes can be retrieved from the supplemental data object based on a type associated with a data request for a data model object.

20 Claims, 11 Drawing Sheets

(56) References Cited

U.S. PATENT DOCUMENTS

| | | | |
|---|---|---|---|
| 2003/0177481 A1* | 9/2003 | Amaru | G06F 16/25 |
| | | | 717/148 |
| 2005/0055290 A1* | 3/2005 | Bross | G06Q 30/06 |
| | | | 705/31 |
| 2005/0256798 A1* | 11/2005 | Herter | G06Q 30/0601 |
| | | | 705/37 |
| 2007/0226093 A1* | 9/2007 | Chan | G06Q 40/02 |
| | | | 705/35 |
| 2009/0063177 A1* | 3/2009 | East | G06Q 50/01 |
| | | | 705/319 |
| 2010/0204970 A1* | 8/2010 | Loomans | G06Q 30/0603 |
| | | | 703/13 |
| 2013/0305213 A1* | 11/2013 | Flores | G06F 8/35 |
| | | | 717/104 |
| 2014/0229267 A1* | 8/2014 | Creamer | G06Q 30/0242 |
| | | | 705/14.41 |
| 2015/0019944 A1* | 1/2015 | Kalgi | G06Q 20/3552 |
| | | | 715/205 |
| 2016/0063422 A1* | 3/2016 | Chen | G06Q 10/067 |
| | | | 705/7.26 |
| 2017/0140405 A1* | 5/2017 | Gottemukkala | G06Q 30/0206 |
| 2017/0277437 A1* | 9/2017 | Jones | G06F 16/178 |
| 2019/0325350 A1* | 10/2019 | Desai | G06F 18/256 |
| 2020/0012752 A1* | 1/2020 | Blumenfeld | G16H 50/30 |
| 2020/0175416 A1* | 6/2020 | Zhao | G06N 20/00 |
| 2020/0242849 A1* | 7/2020 | Cini | G06T 19/20 |
| 2020/0379970 A1* | 12/2020 | Vasilevskiy | G06F 16/2291 |
| 2020/0395004 A1* | 12/2020 | Yamasaki | G10L 15/063 |
| 2022/0058165 A1* | 2/2022 | Kussmann | G06F 16/2272 |
| 2023/0109718 A1* | 4/2023 | Polen | G06F 16/211 |
| | | | 707/803 |

* cited by examiner

FIG. 7

```
@AbapCatalog.sqlViewName: 'ISAMPLESO'
@EndUserText.label: 'Sample Sales Order'
@ObjectModel.compositionRoot: true
@ObjectModel.representativeKey: 'SalesOrder'     704
@Analytics.dataCategory: #DIMENSION
@Search.searchable: true
define view I_SampleSalesOrder
                          712
as select from    vbak
              716      716
 left outer to one join vbkd on  vbak.vbeln = vbkd.vbeln
710                          and vbkd.posnr = '000000'
association [0..*] to I_SampleSalesOrderItem as _Item    752
 on $projection.SalesOrder = _Item.SalesOrder
association [0..1] to Z_LocalizationData as _LOCDAT on _LOCDAT_DocumentType = 'DocType1'  748
        730                         740                  and _LOCDAT_RecordType = '1'     744
                                          760            and $projection DocID = _LOCDAT DynamicKey1
                                                         and $projection DocYear = _LOCDAT DynamicKey2
                                                         and $projection DOCITEM = _LOCDAT Dynamic Key3
association [0..1] to Z_LocalizationData as _LOCDATN on _LOCDAT_DocymentType = 'DocType1'  748
        734                         740 700             and _LOCDAT_RecordType = '2'  746
                                          754           and $projection DocID = _LOCDATN DynamicKey1
                                                        and $projection DocYear = _LOCDATN DynamicKey2
                                                        and $projection DOCITEM = _LOCDATN Dynamic Key3
{
  @Search.defaultSearchElement: true
  key cast(vbak.vbeln as vdm_sales_order preserving type) as SalesOrder,
  @ObjectModel.association.type: [#TO_COMPOSITION_CHILD]   //Composition
  _Item,
  vbak.vtweg                                   as DistributionChannel,
  @ObjectModel.foreignKey.association: '_SoldToParty'
  vbak.kunnr                                   as SoldToParty,
  _SoldToParty,
  @DefaultAggregation: #SUM
  @Semantics.amount.currencyCode: 'TransactionCurrency'
  vbak.netwr                                   as TotalNetAmount,
  @Semantics.currencyCode: true
  @ObjectModel.foreignKey.association: '_TransactionCurrency'
  vbak.waerk                                   as TransactionCurrency,
  _TransactionCurrency,
  ...
}
where vbak.vbtyp = 'C';
```

700
720
708
716

DENORMALIZED DATA OBJECT HAVING SUPPLEMENTAL ATTRIBTUES FOR CORE DATA MODEL OBJECTS

FIELD

The present disclosure generally relates to data objects that store data accessible to application processes. Particular implementations relate to storing supplemental attributes, such as for localizing data to a particular jurisdiction, in a single data object separate from core data objects that have data common to a particular use scenario, such as attributes that are not specific to a particular jurisdiction.

BACKGROUND

In many scenarios, software applications use some data that is common to the scenarios, but where other data differs. For example, a software company that develops data models for use in a particular field, such as accounting or supply chain management, may have a set of database objects (such as relational database tables or views) that store data for a particular use scenario. Consider accounting software. At least portions of the data model might be of use in a variety of jurisdictions. For example, data regarding sales and expenses may be stored in a common manner regardless of a jurisdiction in which an entity is subject to taxation. Some calculations based on such data (that in turn provide other relevant data), such as a calculation of total sales over a time period, may also be common across multiple jurisdictions.

However, in many cases particular data that needs to be maintained or calculated, as well as data forming the basis for such calculations (such as tax rates or tax classifications), can differ among jurisdictions, particularly in heavily regulated areas such a financial reporting/taxation or regulatory compliance. As an example, tax calculations to be performed for purposes of tax payment in Germany can differ in large measure from those performed for purposes of tax payment in Brazil.

In typical software development processes, a core data model is developed that includes model objects that model data organization (such as tables or views) and data relationships (foreign key or other types of relationships or associations) that are believed to be common among jurisdictions. Once the core data model is developed, it can be "enhanced" for use in specific jurisdictions. For Germany, objects in the core data model can be modified to include attributes that are needed for calculating taxes in Germany, and new data model objects may optionally be needed that integrate into the core data model. Different additions/modifications may be needed for Brazil. Given the complexity of data models, "localizing" data objects for a particular software application/use scenario can be time consuming, complex, and error prone. Accordingly, room for improvement exists.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The present disclosure provides techniques and solutions for storing data in a way that facilitates the update and creation of data models, as well as conserving computing resources when accessing such data. A number of data objects can be included in a data model, such as a core data model that can be used in various jurisdictions. A supplemental data object is created that includes data relevant to data objects in the data model. For example, the supplemental data object can include localization attributes. The supplemental data object can be considered as denormalized. A request for data can retrieve data from a data object in the data model, as well as data in the supplemental data object. Different sets of attributes can be retrieved from the supplemental data object based on a type associated with a data request for a data model object.

In one aspect, the present disclosure provides a process of retrieving attributes from a supplemental data object. For example, the supplemental data object can be a localization table that includes localization attributes that supplement attributes of a data object in a core data model.

A first request for data, associated with a first type, is received for a first set of one or more attributes of a first data object. A second data object has an association with the first data object. The second data object includes a second set of one or more attributes. At least a portion of attributes of the first set of one or more attributes are different than attributes of the second set of one or more attributes.

A third set of attributes of the first set of one or more attributes are determined that are specified for the first type. The third set of attributes has a number of attributes less than a number of attributes of the first set of one or more attributes. A first set of results are provided in response to the first request for data, where the first set of results includes attributes of the third set of attributes.

A second request for data for the first set of one or more attributes of the first data object is received. A third data object has an association with the first data object. The third data object includes a fourth set of one or more attributes. At least a portion of attributes of the first set of one or more attributes are different than attributes of the fourth set of one or more attributes. A second set of results is provided in response to the second request for data.

The present disclosure also includes computing systems and tangible, non-transitory computer readable storage media configured to carry out, or including instructions for carrying out, an above-described method. As described herein, a variety of other features and advantages can be incorporated into the technologies as desired.

BRIEF DESCRIPTION OF THE DRAWINGS

FIG. 7 provides a definition of an example core data object, including definitional elements that associate the core data object with a localization data object.

DETAILED DESCRIPTION

Example 1—Overview

Figure 1:
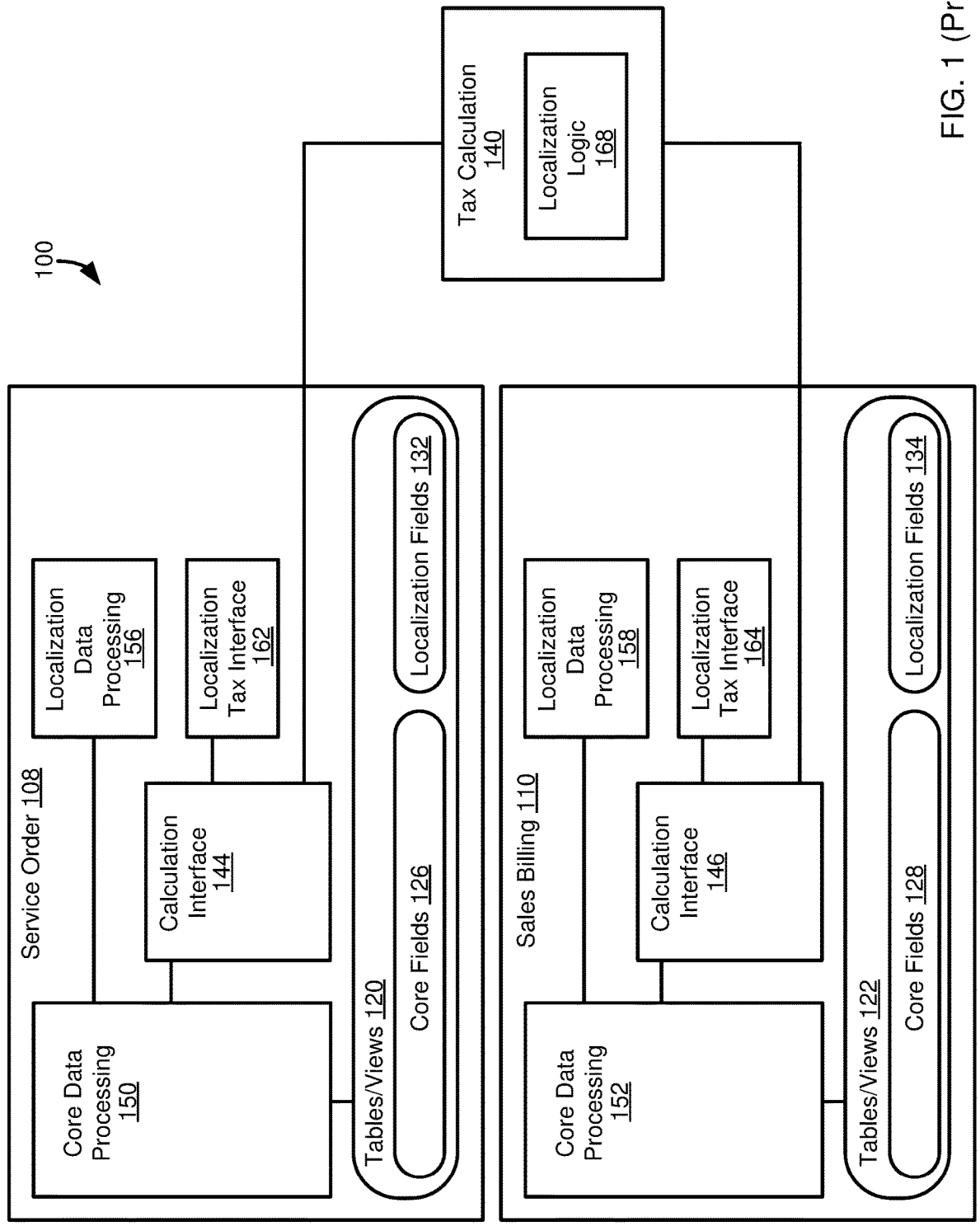
FIG. 1 is a diagram illustrating how localization attributes and their associated data are typically integrated into objects of a core data model having core attributes that are consistent between jurisdictions.

In many scenarios, software applications use some data that is common to the scenarios, but where other data differs. For example, a software company that develops data models for use in a particular field, such as accounting or supply chain management, may have a set of database objects (such as relational database tables or views) that store data for a particular use scenario. Consider accounting software. At least portions of the data model might be of use in a variety of jurisdictions. For example, data regarding sales and expenses may be stored in a common manner regardless of a jurisdiction in which an entity is subject to taxation. Some calculations based on such data (that in turn provide other relevant data), such as a calculation of total sales over a time period, may also be common across multiple jurisdictions.

However, in many cases particular data that needs to be maintained or calculated, as well as data forming the basis for such calculations (such as tax rates or tax classifications), can differ among jurisdictions, particularly in heavily regulated areas such a financial reporting/taxation or regulatory compliance. As an example, tax calculations to be performed for purposes of tax payment in Germany can differ in large measure from those performed for purposes of tax payment in Brazil.

In typical software development processes, a core data model is developed that includes model objects that model data organization (such as tables or views) and data relationships (foreign key or other types of relationships or associations) that are believed to be common among jurisdictions. Once the core data model is developed, it can be "enhanced" for use in specific jurisdictions. For Germany, objects in the core data model can be modified to include attributes that are needed for calculating taxes in Germany, and new data model objects may optionally be needed that integrate into the core data model. Different additions/ modifications may be needed for Brazil. Given the complexity of data models, "localizing" data objects for a particular software application/use scenario can be time consuming, complex, and error prone.

Potentially increasing the complexity and effort of localizing more generic data models, the localization process can be cumbersome if different software development teams are responsible for developing the core data model and for developing a particular localization. For example, a developer on a localization team may lack permission to modify an object of the core data model, and so the developer may either need to wait to be granted access to the object or to request that the change be made by a member of the core development team. Another issue is that the presence of localization information can make it more complex to update/modify a core data model, such as if an initial version of the core data model is released/installed and then the core data model development team updates or adds model objects.

The use of different development teams can result in additional issues. For instance, if a core development team is asked to implement localization information in core data model objects, there can be cases where it is sufficient for the localization team to provide the core development team with technical information about requested changes, such as additional fields to be added to core model objects, their data types, and optionally relationships with other core data model objects. However, other changes may be more complex, including because of relationships between tables/ attributes, including primary key-foreign key relationships, JOIN conditions, and view definitions. More complex changes may require a localization team to work more closely with the core development team to explain the nature of the localization needed and to determine how it should be implemented. This close coordination can require additional time, effort, and complexity.

Another issue that can arise is that localization information may be duplicated for different "document types" where a document type can include attributes of data objects in the core data model, or even for multiple data objects used for a single document type. For example, at least some common localization information can be duplicated in both a billing document and a sales order document. This duplication can result in more computer memory or persistent storage being needed to represent the same data. In a similar manner, runtime operation can be slower if all localization data is loaded for one or more core data objects, even if only a portion of the data is needed for a particular computing process. The loading of unneeded data can also result in inefficient use of computer memory.

The present disclosure provides techniques that can be used to help address issues noted above. Rather than storing localization information, such as attributes/columns/fields of database tables or views, in relevant objects of a core data model, the localization information can be stored in a separate data object, just as a separate table. Data objects in the core data model can then be associated with the separate data object so that the localization data can be retrieved.

In a particular implementation, a single data object can include localization information from multiple data objects in a core data model. Including data from multiple data objects in a single table can have various benefits, including storing data values a single time even if a given data value is relevant to multiple objects in a core data model (or higher level computing objects, such as elements of a virtual data model, such as CDS views as used in technologies of SAP SE of Walldorf, Germany, or logical data objects, such as BUSINESSOBJECTS, also of SAP, where a logical data object can be a particular type of abstract data type which can reference CDS views, and wherein in turn the CDS views can reference data objects in a relational database that stores data accessed through the BUSINESSOBJECT/CDS views).

The connection of a single source of localization data to multiple core data model objects or other objects that access the localization data can be thought of as a denormalization process. Along with the benefits described above, denormalization can avoid JOIN or UNION operations between data objects, which can improve performance and simplify query development and execution.

Since localization data (including the attributes that define/store such data) is separate from core data model objects, changes/updates to a core data schema become more straightforward. In a similar manner, since a developer working on localization need not access core data model objects, the localization process/permissions issues become simplified. When localization data is needed, a particular subset of the localization data can be selected, which can conserve memory use and increase performance, since runtime objects can be instantiated/updated more quickly as compared with loading a greater volume of localization data that is not actually needed for a process.

Although the present disclosure is described using the specific example of "localization data," the disclosed techniques are not limited to such scenarios. "Localization" can be considered as a particular example of data objects having some shared data, where at least a portion of the shared data is represented in a common/shared data object. As alternative terminology, disclosed techniques can be used when data objects in a core data model are supplemented with a data object in a supplemental data model.

Example 2—Example Colocation of Core Attributes and Localization Attributes

FIG. 1 presents a computing environment 100 that illustrates an existing technique for handling localization data. The computing environment 100 includes processing components for two documents, a service order document 108 and a sales billing document 110. The documents 108, 110 are associated with one or more data objects, such as one or more relational database tables or views 120, 122. Alternatively, the data associated with the data objects can be stored in another manner, or can be accessed through one or more other computing objects, including those that can be based on model objects. In particular, data stored in the tables or views 120, 122 (or other format) can be accessed through a BUSINESSOBJECT (SAP SE, Walldorf, Germany) or using CDS views, a particular type of virtual data model.

The tables or views 120, 122 can have a plurality of core fields 126, 128. Core fields 126, 128 can represent fields (also referred to as attributes, and which can be represented as columns in a relational database table/view). The tables or views 120, 122 can also include one or more localization fields 132, 134. Although shown as single "collections," the core fields 126, 128 and the localization fields 132, 134 are typically located in a plurality of database tables. Some core fields 126, 128 may be in tables that do not have localization fields. Because the tables or views 120, 122 that have the core fields 126, 128 and the localization fields 132, 134 are "separate" (data is stored discretely in each table, although data from multiple tables can be operationally combined, in at least some cases, such as using a JOIN operation), localization fields 132, 134 can be duplicated between multiple tables, including having duplicate values in multiple tables 120, 122.

As has been discussed, an issue with the development paradigm of FIG. 1 is that typically a core data model, with the core fields 126, 128, is developed, and then localization fields 132, 134 are added to appropriate objects of the core data model. The work to add localization fields 132, 134 to core data model objects can be extraordinarily complicated and time consuming, and typically is performed for each justification, since each jurisdiction typically is associated with some data that is specific to that jurisdiction. As also discussed, the presence of localization fields 132, 134 in objects of the core data model can complicate efforts to update/align a localized core data model with changes to the core data model.

Now, consider a process that uses data in the tables or views 120, 122, such as a tax calculation process 140. The tax calculation process 140 can access respective calculation interfaces 144, 146 for the service order document 108 and the sales billing document 110. The calculation interfaces 144, 146 can access data in the tables/views 120, 122, particularly the core fields 126, 128, and can perform processing using data values obtained therefrom. Access to data can be mediated by core data processing components 150, 152. Respective localization data processing 156, 158 can obtain values for the localization fields 132, 134 where they can be processed using localization interfaces 162, 164. Values from the calculation interfaces 144, 146, including data provided by the localization interfaces 156, 158, can be provided to the tax calculation process 140. The tax calculation process 140 can include localization logic 168. The localization logic 168 can determine what calculations should be performed as part of localizing the tax calculation process 140, including localization fields 132, 134 whose values are needed.

Example 3—Example Separation of Core Attributes and Localization Attributes

Figure 2:
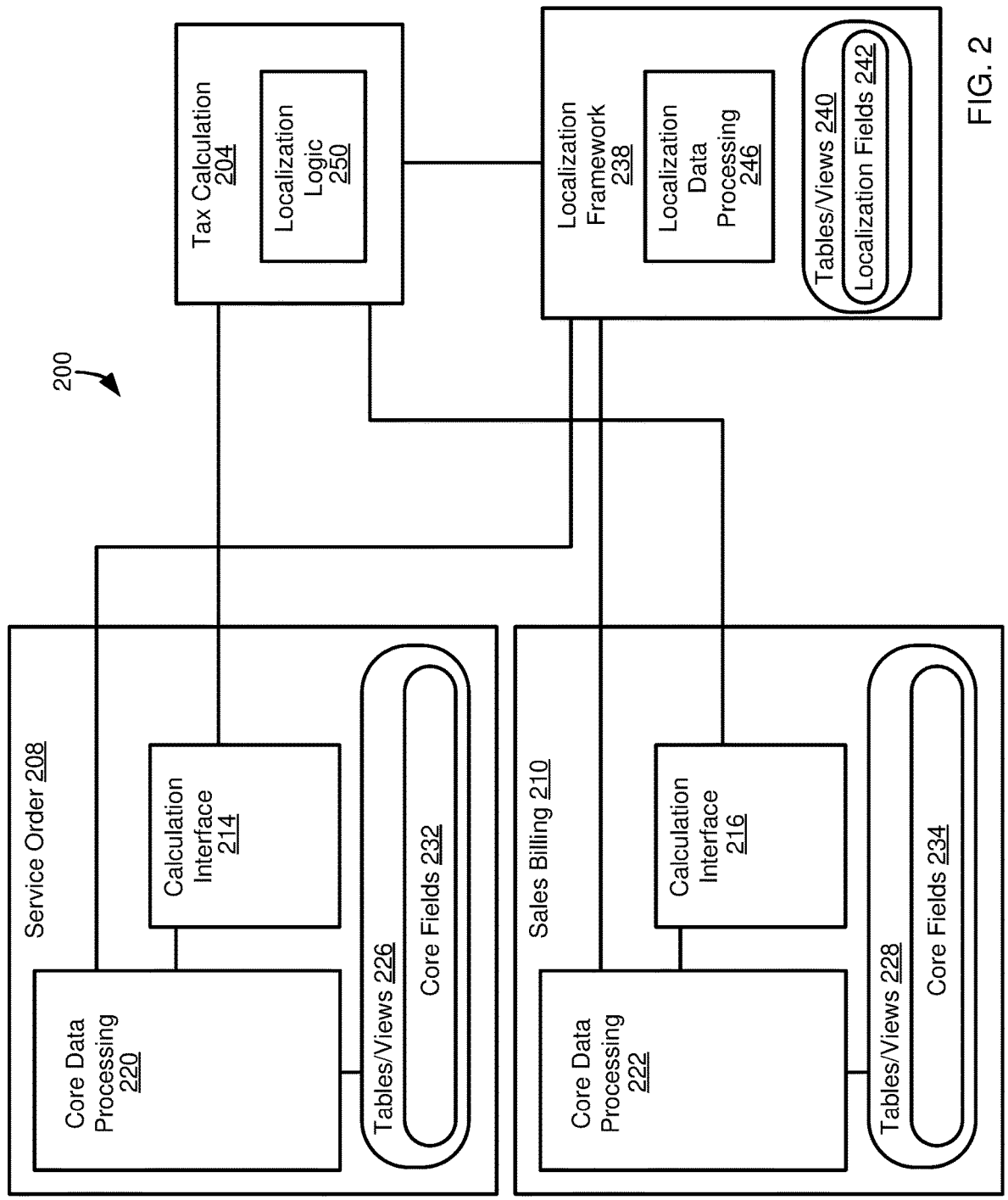
FIG. 2 is a diagram illustrating a disclosed technique where localization attributes are stored in a data object other than a data object that includes core attributes.

FIG. 2 presents a computing environment 200 that illustrates how a tax calculation process 204, which can be analogous in terms of output/functionality to the tax calculation process 140, can use disclosed techniques. Portions of the computing environment 200 can be analogous to the computing environment 100, particularly those related to the core fields 126, 128.

As with the computing environment 100, the computing environment 200 includes a service order document 208 and a sales billing document 210. The documents 208, 210 include respective calculation interfaces 214, 216 and core data processing 220, 222, where the core data processing can obtain data stored in core fields 232, 234 stored in tables/views 226, 228 of a core data model. The nature/functionality of these components, and of the tables/views, 226, 228 can be analogous to the description of the corresponding components of FIG. 1.

A difference between the tables/views 226, 228 of FIG. 2 and the tables/views 120, 122 of FIG. 1 is that the tables/views 226, 228 do not include the localization fields 132, 134. Rather, localization data is stored in localization fields 242 are stored in association with a localization framework 238 in one or more tables or views 240, where the localization framework can also include localization data processing 246, which can be analogous to the localization data processing 156, 158 of FIG. 1, except that data is obtained from the tables/views 240 that store localization data, rather than tables/views that store both core data and localization data.

As will be described as this specification progresses, in particular implementations localization data is maintained in a single table/materialized view 240. The table 240 can be considered as denormalized, as at least a portion of the localization data can be relevant to/referenced by one or more data objects of the core data model (that is, tables/views 226, 228, including tables/views of both the service order document 208 and the sales billing document 210).

During operation of the tax calculation process 204, localization logic 250 can be used to obtain localization data from the localization framework 238. Information for the core fields 232, 234 can be obtained through respective calculation interfaces 214, 216. The localization framework 238 can also access core data processing 220, 222 of the documents 208, 210, including to determine what localization fields 242 are relevant to a particular table/view 226, 228 of a core data model.

Example 4—Example Duplication of Localization Attributes

Figure 3:
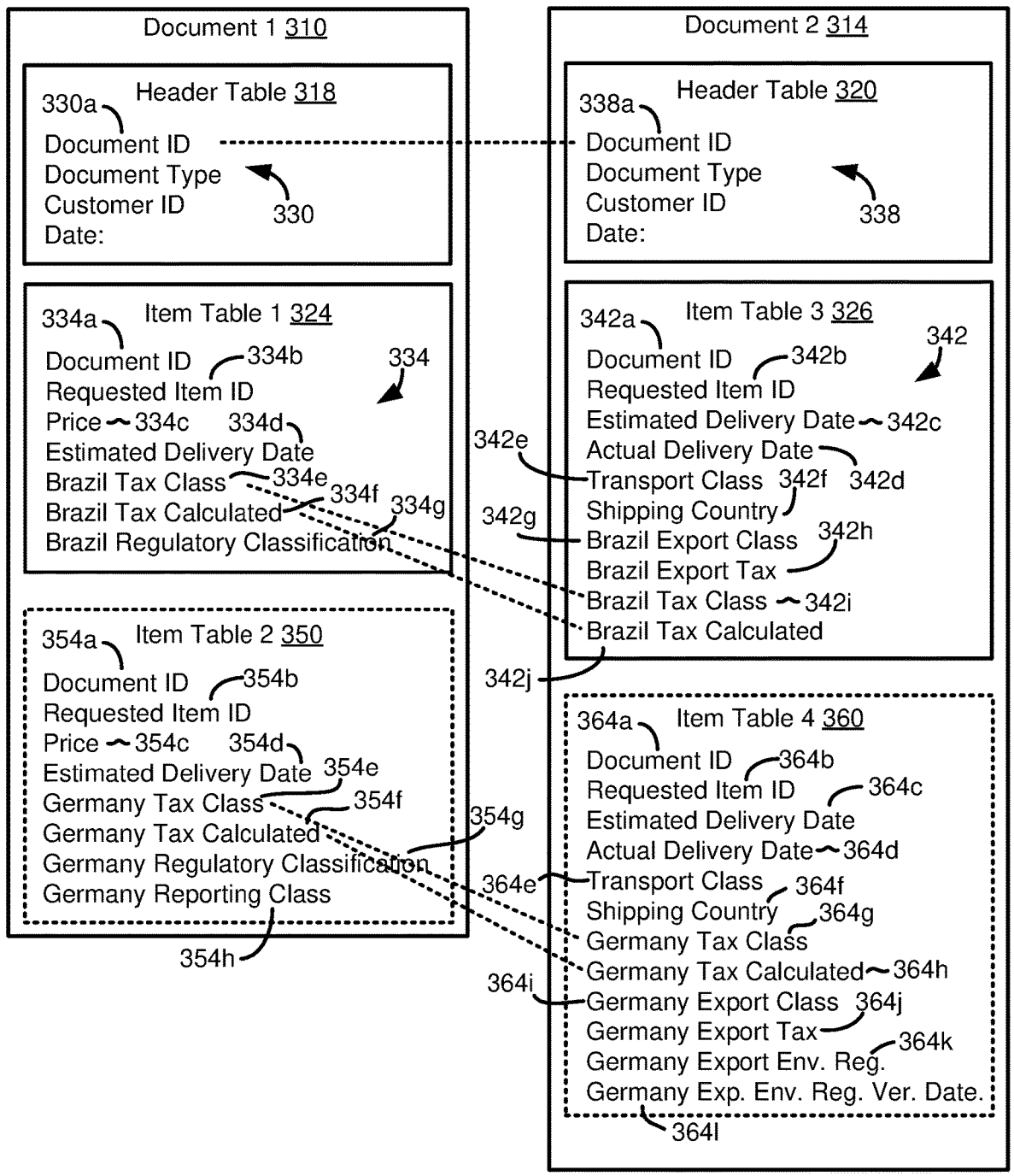
FIG. 3 is a diagram illustrating how different data objects in a core data model can have different localization attributes between different localizations, and how at least some localization attributes can be common to multiple data objects associated with a particular document, or with data objects associated with different documents.

FIG. 3 illustrates how at least a portion of attributes in objects that are used by a particular document, or are otherwise accessed for particular purposes, can overlap between such objects, and between documents. In particular, FIG. 3 illustrates tables for a first document 310 and tables for a second document 314. The documents 310, 314 include respective header tables 318, 320 and respective item tables 324, 326. In general, the use of header tables and item tables helps avoid storing redundant values. As a simple example, consider a sales transaction that involves the purchase of multiple items. The sale may be for a specific store, on a specific date and time, processed by a particular employee, and associated with a particular transaction identifier. If a single table were used to store data for this transaction, typically the table would include columns for information that is common between the individual items in the transaction—the store, date, an employee identifier, etc. However, storing this redundant information can consume unnecessary computer storage resources—either persistent storage or memory.

Accordingly, a data modelling approach involves placing common attributes for a modelled entity type in a header table, and placing attributes having at least potentially different values for instances of the entity type in an item table. The header and item tables can be related by a key, which can be a primary key that may have been selected had all of the information been included in a single, combined table.

Turning again to FIG. 3, the header table 318 is shown as having a plurality of attributes 330, where an attribute 330*a* corresponds to attribute 334*a* of attributes 334 of the item table 324. The attributes 334 can represent a typical modelling approach where a table includes both core attributes and localization attributes, shown as core attributes 334*a*-334*d* and localization attributes 334*e*-334*g*. Optionally, localization attributes could also be included in the header table 318. Also, the particular modelling structure of header and item tables is provided to illustrate a particular use case of the disclosed technologies, where the disclosed technologies can be used in other modelling approaches, where at least some model objects do not have header/item relationships.

FIG. 3 further illustrates how both core data attributes and localization attributes can overlap between modeled objects, such as tables. As shown, the identifier attribute 334*a* is also present as attribute 338*a* of attributes 338 of the header table 320 of the document 314. Similarly, two of the localization attributes of the item table 324, attributes 334*e*, 334*f*, are also present as attributes 342*i*, 342*j* of localization attributes 342*g*-342*j* of item table 326 of the document 314. Some localization attributes do not overlap between the item tables 324, 326, such as localization attribute 334*g*, only in item table 324, and localization attributes 342*g*, 342*h* of item table 326.

FIG. 3 also illustrates how documents 310, 314 can differ between jurisdictions. Consider item table 350, in a scenario where item table 350 is part of a data model used for Germany, and where item table 324 is used for Brazil. While the header table 318 can be used for both jurisdictions, at least in the example shown, core attributes 334*a*-334*d* and 354*a*-354*d* are included in both item tables 324, 350, while the localization attributes 334*e*-334*g* of the item table 324 for Brazil are, understandably, different from localization attributes 354*e*-354*h* of the item table 350 for Germany. As explained above, these differences can result in significant effort to incorporate localization attributes into a core data model.

Regarding the two documents 310, 314, like item tables 324, 326, at least a portion of localization attributes 354, in particular attributes 354*e* and 354*f*, are also present in an item table 360 for the German localization, as localization attributes 364*g*, 364*h*. Other localization attributes can be located in a single table, such as localization attributes 354*g*, 354*h* of item table 350 and localization attributes 364*i*-354*j* of item table 360. Although not shown in FIG. 3, it should be appreciated that any given localization attribute can optionally be shared with multiple other tables. Like the item tables 324, 350, the item table 360 has the same core attributes 364*a*-364*f* as the attributes 342*a*-342*f* of the item table 326.

Figure 4:
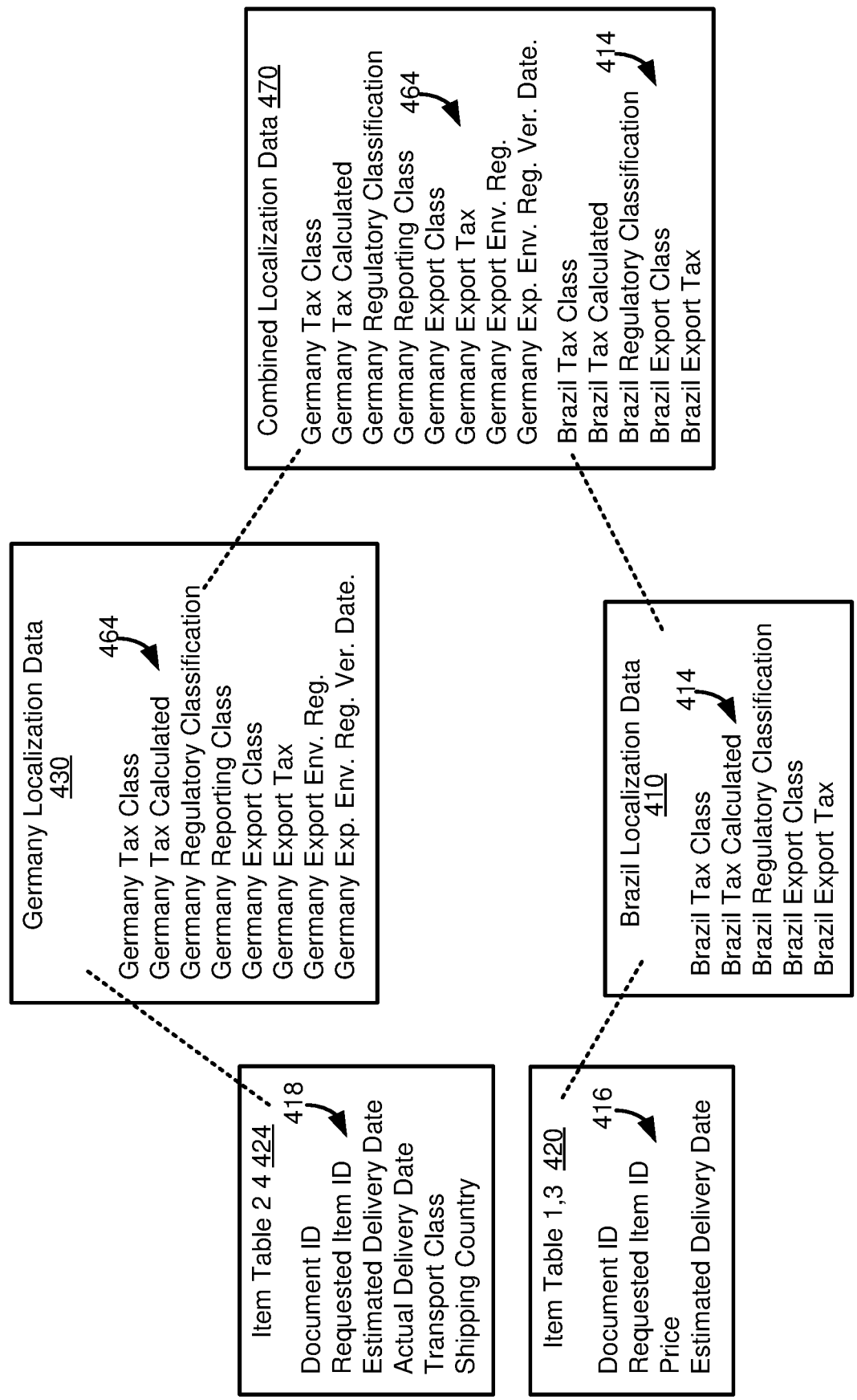
FIG. 4 is a diagram illustrating how core and localization attributes of FIG. 3 can be separated into different data objects according to a disclosed technique.

Example 5—Example Separation of Localization Attributes and Core Attributes into Different Data Objects FIG. 4 illustrates how localization attributes from one or more modelled objects can be included in a localization object that is separate from core model objects. In particular, the technique is illustrated using the example of the item tables 324, 326 and 350, 360 of FIG. 3. Localization attributes 334*e*-334*g* of item table 324 and localization attributes 342*g*-342*j* from item table 326 have been combined as localization attributes 414 in a single localization object (table) 410, leaving only core attributes 334*a*-334*d* and 342*a*-342*f*, illustrated as core attributes 416, 418 in updated versions 420, 424 of the item tables 324, 326.

In a similar manner, localization attributes 354*e*-354*h* of item table 350 and attributes 364*g*-364*l* of item table 360 have been combined in a single localization object 430 as localization attributes 464, leaving only core attributes 354*a*-354*d* and 364*a*-364*f* in updated versions the item tables 350, 360, which also correspond to item tables 420, 424.

If a given scenario includes multiple localizations, such as if localization attributes for both Brazil and Germany were included in a data model, the localization attributes can be maintained in separate objects, as shown (objects 410, 430). Optionally, multiple sets of localization data, including all localization data, can be included in a single object, such as shown for object 470, which includes both the localization attributes 414 and the localization attributes 464.

The localization tables 410, 430, 470 illustrate how localization attributes in a localization table can have either a one-to-one cardinality or a one-to-many cardinality, where a localization attribute can be associated with a single object in a core model, or can be associated with multiple objects in a core model. The location tables 410, 430, 470 can be considered as denormalized, since attributes from multiple objects are combined in a single object. Table 470 is further denormalized in that localization attributes for multiple localizations are combined in a single object. Note that denormalization can be considered in terms of modifying an existing data model, where existing data is transferred from a prior format where core and localization data are combined in common objects, to a disclosed modelling technique where core attributes and localization attributes are associated with different objects. Denormalization can also be considered from strictly a modelling perspective. That is, data can be stored in objects according to disclosed techniques without migrating the data from a prior modelling approach. The data is still denormalized, in that it combines localization data from multiple other objects.

Example 6—Example Structure of Localization Object

Figure 5:
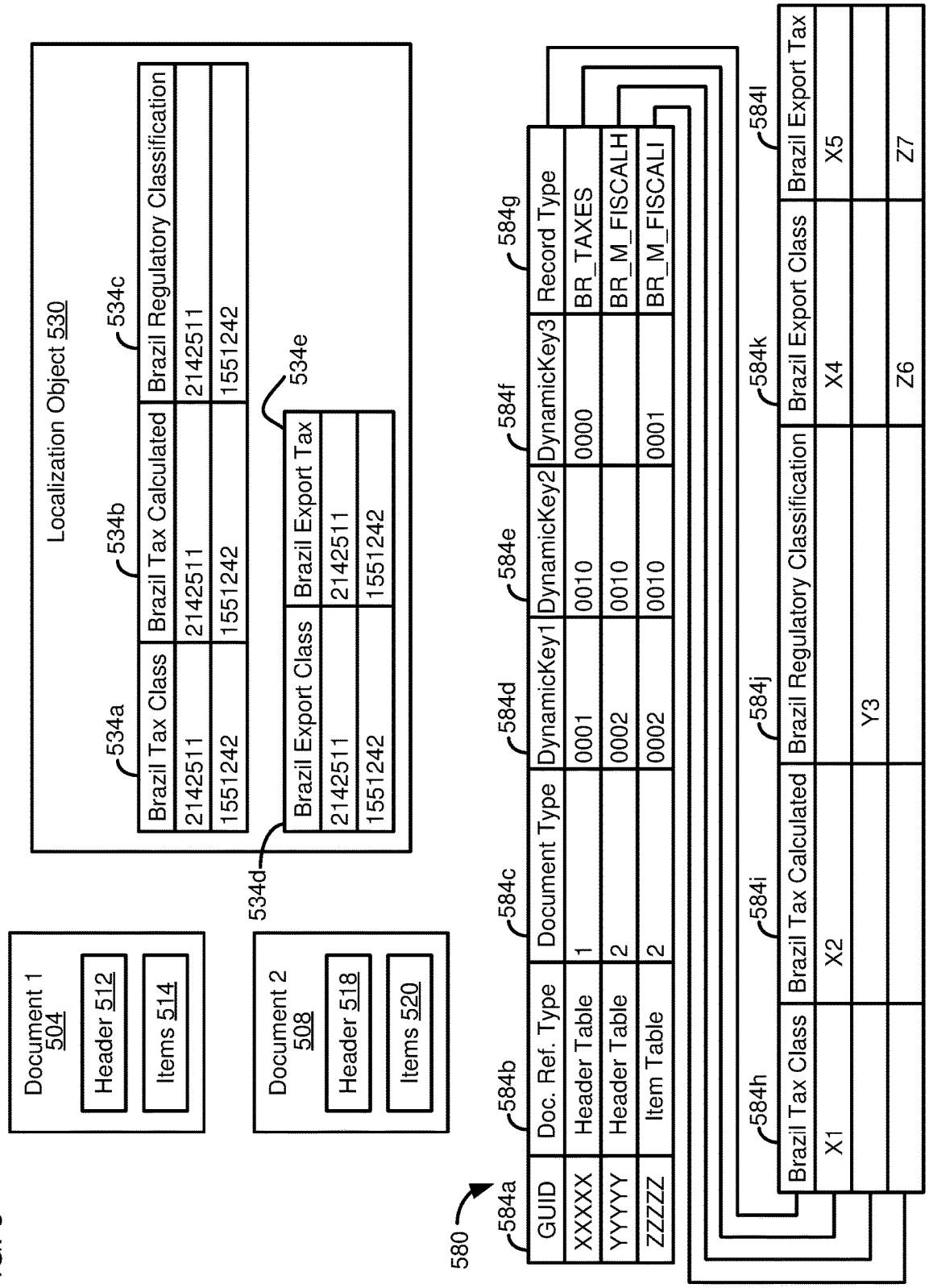
FIG. 5 is a diagram providing further examples illustrating how localization attributes, including for multiple core data objects of one or more documents, can be represented in a localization data object, and techniques that can be used to selectively access localization attributes.

FIG. 5 provides more granular details about how localization information from multiple source objects can be combined/maintained in a common object. The approach is illustrated using the header tables 310, 314 of FIG. 3 and the item tables 420, 424 and the localization table 410 of FIG. 4. The header table 310 and the item table 420 can represent the first document 310 of FIG. 3, shown as document 504, while the header table 314 and the item table 424 can represent the second document 314 as document 508.

The first document 504 includes a header table 512 and an item table 514, which can correspond to the header table 318 and the item table 324. The second document 508 includes a header table 518 and an item table 520, which can correspond to the header table 320 and the item table 326. The header tables 512, 518 and the item tables 514, 520 can include the attributes of the header tables 318, 320 and of the item tables 420, 424, which are not shown in FIG. 5 for simplicity of presentation.

FIG. 5 illustrates examples of localization attributes, including example values, which can be included in a localization object 530. In particular the location object 530 can include one or more attributes that allow localization data to be linked to other objects, such as objects that include core attributes for core objects that are supplemented with the localization attributes.

Columns 534a-534c correspond to the localization attributes 334e-334g and 342i and 342j of FIG. 3, while columns 534d and 534e correspond to the localization attributes 342g and 342h. The localization object 530 provides another illustration as to how localization attributes from multiple core objects can be denormalized in a single localization object. The localization object 530 also illustrates how localization data can be deduplicated/consolidated. Two localization attributes appear in two objects in the documents 310, 314, localization attributes 334e, 342i and 334f, 342j, but only appear once in the localization object 530, as columns 534b, 534c.

Table 580 provides a more particular example of the localization object 530, including illustrating additional attributes that can be added to a localization object to facilitate its use. The table 580 is shown as having columns 584a-584l. Columns 584h-584l correspond to the localization attributes 534a-534e of the localization object 530.

As discussed above, a single localization object 530 can be associated with multiple other objects, such as when the localization object is a localization table that is associated with tables having core fields of a core model. In many cases, the different objects that reference the localization object are associated with different unique identifiers, where the identifiers can be used to identify a particular set of data values of both the core object and a localization object, such as where different core tables use different primary keys, and those various primary keys are desirably represented in the localization table.

The table 580 illustrates this scenario, where columns 584d-584f represent "dynamic key" fields/attributes. The keys can be considered "dynamic" since the particular columns 584d-584f that uniquely identify a row of the table 580 with a particular row of a core table depend on the primary key fields of the core table. In some cases, a single core table has a single key field that can be represented by a single dynamic key column 584d-584f, while in other cases a core table can have a compound/composite key that is formed from multiple columns/attributes, in which can two or more of the dynamic key columns can be used for that core table. In some scenarios, multiple core tables may have one or more dynamic key columns 584d-584f in common.

The table 580 is shown as including a column 584a that provides a globally unique identifier for a given row, which can be helpful since the use of the dynamic key columns 584d-584f can otherwise make row identification dependent on a particular core table, and core tables that lack values for certain dynamic key columns may not provide a way to access corresponding rows of the table. A column 584c can be used to identify a particular document type with which a given entry of the table 580 is associated with. Providing an identifier for the document type can be useful, including because multiple document types may share one or more of localization columns 584h-584l.

In some cases, it can be useful to identify a particular table, or particular table type, associated with a particular row of the table 580. Table 580 illustrates this scenario through a document reference type column 584b. In this case, values of the column 584b indicate whether a particular row of the column is associated with an item table or a header table. In other scenarios, the column 584b can include an identifier of a particular table with which a row of the table 580 is associated, such as a name/identifier of a table (or view) that would be used in query (e.g., using SQL) operations for the table indicated by a value of the column 584b in the row. In yet further scenarios, the column 584b can be omitted, such as when a document type/identifier of the column 584c by itself indicates a table type (such as item or header).

Objects in different documents, or even in objects of a single document, can use different combinations of the localization attributes 584h-584l. For example, a first table in a core model may use columns 584h and 584i, while another may use columns 584j-584l, another may use columns 584h, 584i, and 584l, and another may use columns 584j and 584k. The table 580 can include a record type column 584g that stores an identifier that in turn is associated with a set of one or more of the localization columns 584h-584l that are relevant to the record type, such as illustrated in FIG. 6.

Figure 6:
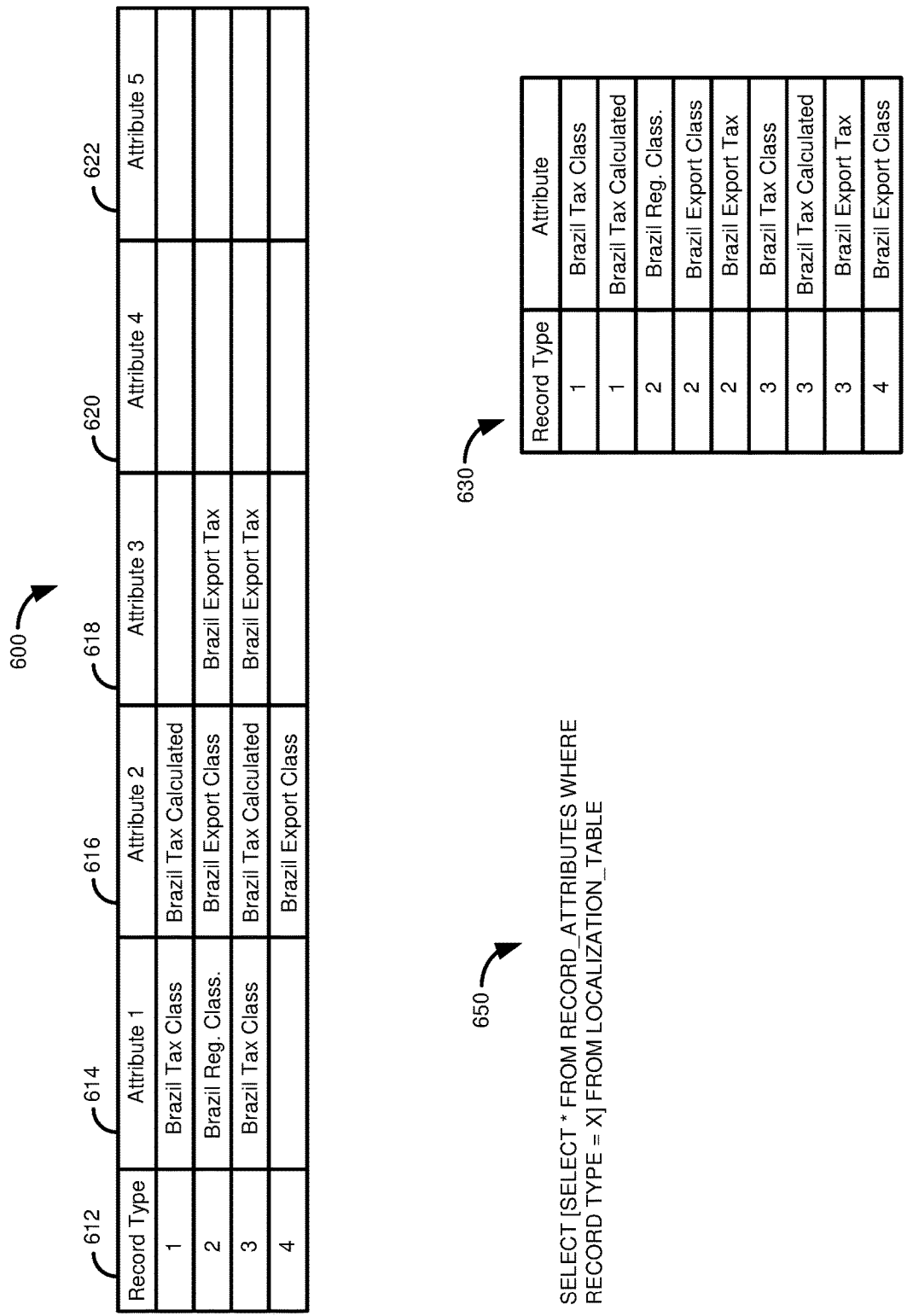
FIG. 6 illustrates table formats that can be used to store localization attributes for particular record types, and a query that can be used to retrieve localization attributes for a particular record type.

In FIG. 6, a table 600 includes columns 614-622 that indicate which localization attributes 584h-584l are used with a particular record type, such as indicated using a value of the column 584g, which is provided in the table 600 using column 612. Rows of the table 600 correspond to the four record type examples discussed above. While the localization attributes 584h-584l for a particular record type are shown as being maintained in the table 600, the information can be maintained in another manner. For example, a given record type can be represented as, or in, an instance of an abstract or composite data type, and can be associated with a variable that stores localization attributes 584h-584l used with that record type, such as in an array/vector. Information can also be maintained in other table formats, such as shown for table 630, which includes the same information as table 600.

In a particular implementation where localization attributes are stored in a table, the table can be used as part of a query process to determine what attributes should be retrieved, or are available, for a particular record type. FIG. 6 illustrates an example query 650 that is defined with respect to the table 600. In the query, all localization attributes/corresponding values are selected from the localization table (table 580) that are relevant to an input record value (a provided value for the variable "X"), where the relevant attributes are selected from the table 600 using the input record value.

Example 7—Association of Core Object with Localization Object in Definition of Core Object FIG. 7 illustrates how a data object, such as a data object of a core data model, can be associated with additional data, such as localization data. The data object has a definition 700, and represents a CDS (CORE DATA SERVICES) VIEW as implemented in technologies of SAP SE of Walldorf, Germany. A CDS VIEW is an object in a virtual data model that references one or more objects (such as tables or views) in a physical data model, such as a model for a relational database. Aspects of CDS VIEW creation can cause appropriate database objects to be instantiated, if they do not already exist.

The data object definition 700 can include a variety of different components, at least some of which can be considered to be metadata models. That is, the data object definition 700 can be a model that is based at least in part on multiple sub-models. The sub-models can specify particular aspects of the overall data object definition 700.

The data object definition 700 can include instructions 708, in this case a SQL statement 710, defining a core metadata model/object having an identifier 712 (which can be used, for example to later access or activate, such as to instantiate, the metadata model). In particular, the instructions 708 shown define a view. Annotations 704 can specify various properties of the view.

The instructions 708 can specify one or more data sources 716. Data sources 716 can define data to which at least a portion of the metadata of the data object definition 700 will apply, and can also supply additional metadata for the data object definition 700. As shown, the data sources 716 includes two tables, "vbak" and "vbkd," which are implemented in a relational database.

The data object definition 700 can optionally include specifications of one or more associations 720, as that term is used in technologies of SAP SE of Walldorf, Germany, including in the context of CDS VIEWS. An association 720 can define a relationship to another data object (including another object in the virtual data model). An association 720 can be processed during the use of the data object definition 700, such as being converted to a SQL expression such as a JOIN. Unlike other conditions or elements that are included in the data object definition 700, associations can define a relationship that can at least in some cases be optional, such as being selectively activated depending upon how the metadata model is accessed. For example, an association 720 can be converted to a JOIN condition that uses a table provided in a SELECT statement that references the data object definition 700.

Of the associations 720, associations 730, 734 relate the metadata model to an object 740 that includes localization attributes. The associations 730, 734 are shown with respective, different record types 744, 746 for a common document type 748, and where selection of attributes from the object 740 are created as separate objects (such as tables) 752, 754. The associations 730, 734 also are shown are including dynamic key values 760, which can be used to retrieve particular rows from the object 740.

Example 8—Example Access to Localization Attributes of Localization Object

Figure 8:
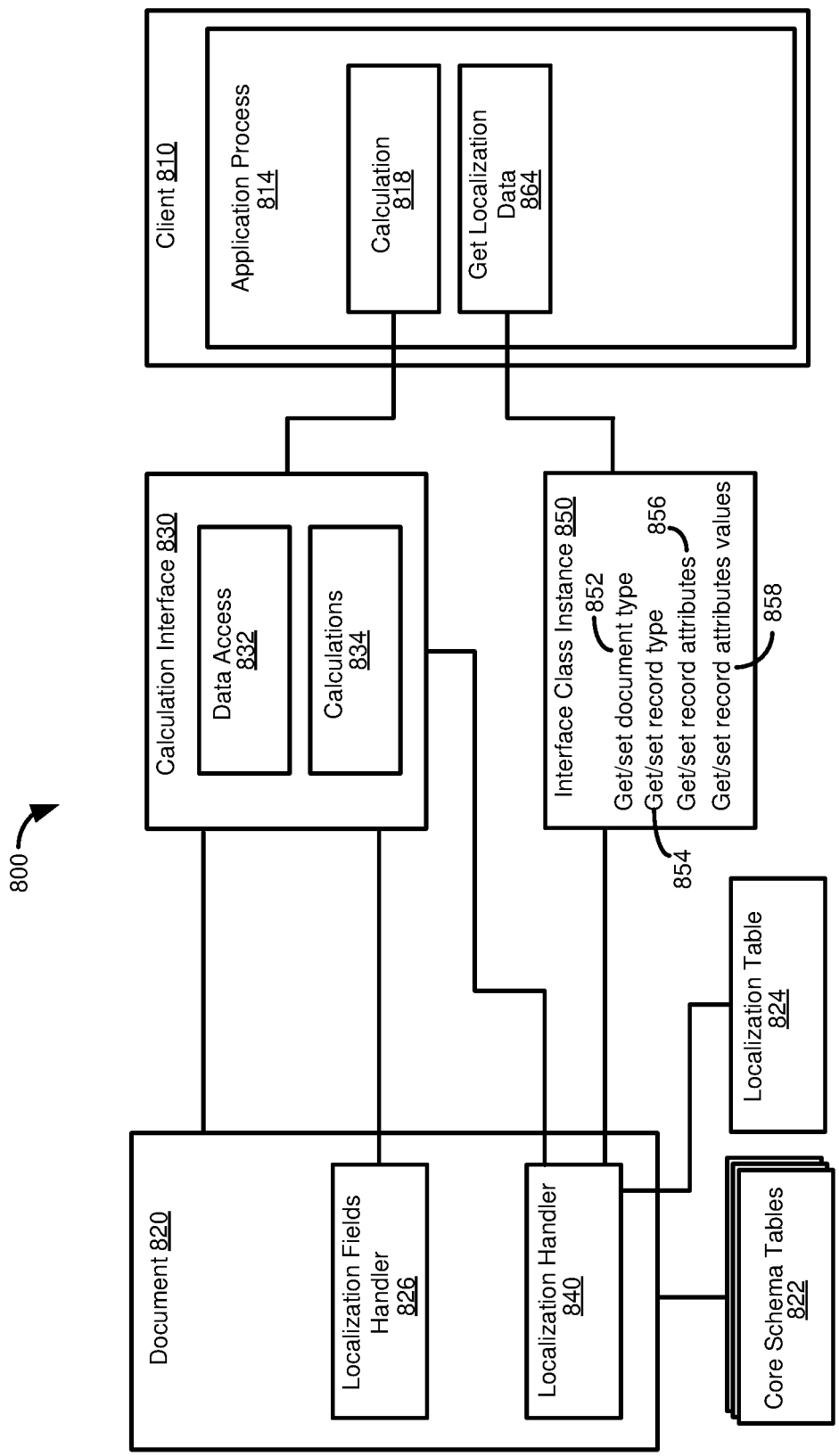
FIG. 8 is a diagram illustrating how localization data can be accessed, including through the use of an interface class instance.

FIG. 8 illustrates a software environment 800 providing further details regarding how disclosed techniques can be implemented. The computing environment 800 includes an application process 814 performed at a client 810. The application process 814 can perform various calculations 818 to provide an output, where the calculations use data associated with a document 820. The document 820 can be associated with data in core schema tables 822 and data in a localization table 824.

When the calculations 818 are to be performed, a calculation interface 830 can be accessed, which can obtain core data for the document 820 from the core schema tables 822 using data access methods 832 of the calculation interface. The calculation interface 830 can also obtain information about relevant localization fields (attributes) for/from the document 820 using a localization fields handler 826 of the document, and can access the data in the localization table 824 using a localization handler 840.

The localization handler 840 can perform actions such as formulating a query for appropriate data in the localization table 824, including based on a provided record type to determine attributes that are relevant to a request. The calculation interface 830 can perform calculations 834 on core or localization data, including returning results to the application process 814. The calculation interface 830 can also return core or localization data to the application process 814 that as not been subject to calculations.

Data from the localization table 824 can be maintained in an instance of an interface class 850. In some cases, requests for localization data are received from the client 810, the calculation interface 830, or other sources, and are provided to the interface class instance 850. The interface class instance 850 can cause relevant actions to be performed, either directly using methods of the class instance or by methods that call suitable functionality of the localization handler 840.

The interface class instance 850 is shown as having various methods. Methods 852 can be used to set particular document types that are being handled by the particular interface class instance 850 (for example, different user sessions can be associated with different interface class instances), and to determine what document types have been set for the interface class instance. Similarly, methods 854 can be used to set/get particular record types that are "active" for the interface class instance 850. Methods 856 can be used to determine what localization attributes are relevant for a particular record type, or to set relevant localization attributes for a record type. Methods 858 can be used to retrieve values from the localization table 824, or to save values to the localization table. In a particular implementation, the interface class instance 850 can be used as a "workspace" to add/delete/change localization data, but the data is not saved to the localization table 824 until a suitable command (e.g., "set"/"save") is sent. As mentioned, the interface class instance 850 can also be accessed directly by the application process 814, such as with a process 864 to get localization data that is activated in response to a user request to view localization data (which can be provided, for example, using a user interface control of a user interface).

In a specific example, the interface class instance 850 is implemented using a singleton pattern. That is, a single instance 850 of the interface class is provided for each user/session, and mediates all requests for localization data. The singleton pattern can simplify data access by avoiding coordination issues that might arise if multiple class instances were able to access localization data, including locking considerations to avoid having inconsistent data for different data readers. Thus, the interface class instance 850 can hold localization data for multiple documents/record types, and suitable filtering can be used to obtain data that is relevant to a particular request, such as by specifying a document or record type in a data request.

Example 9—Example Access to Supplemental Attributes in Supplemental Data Object

Figure 9:
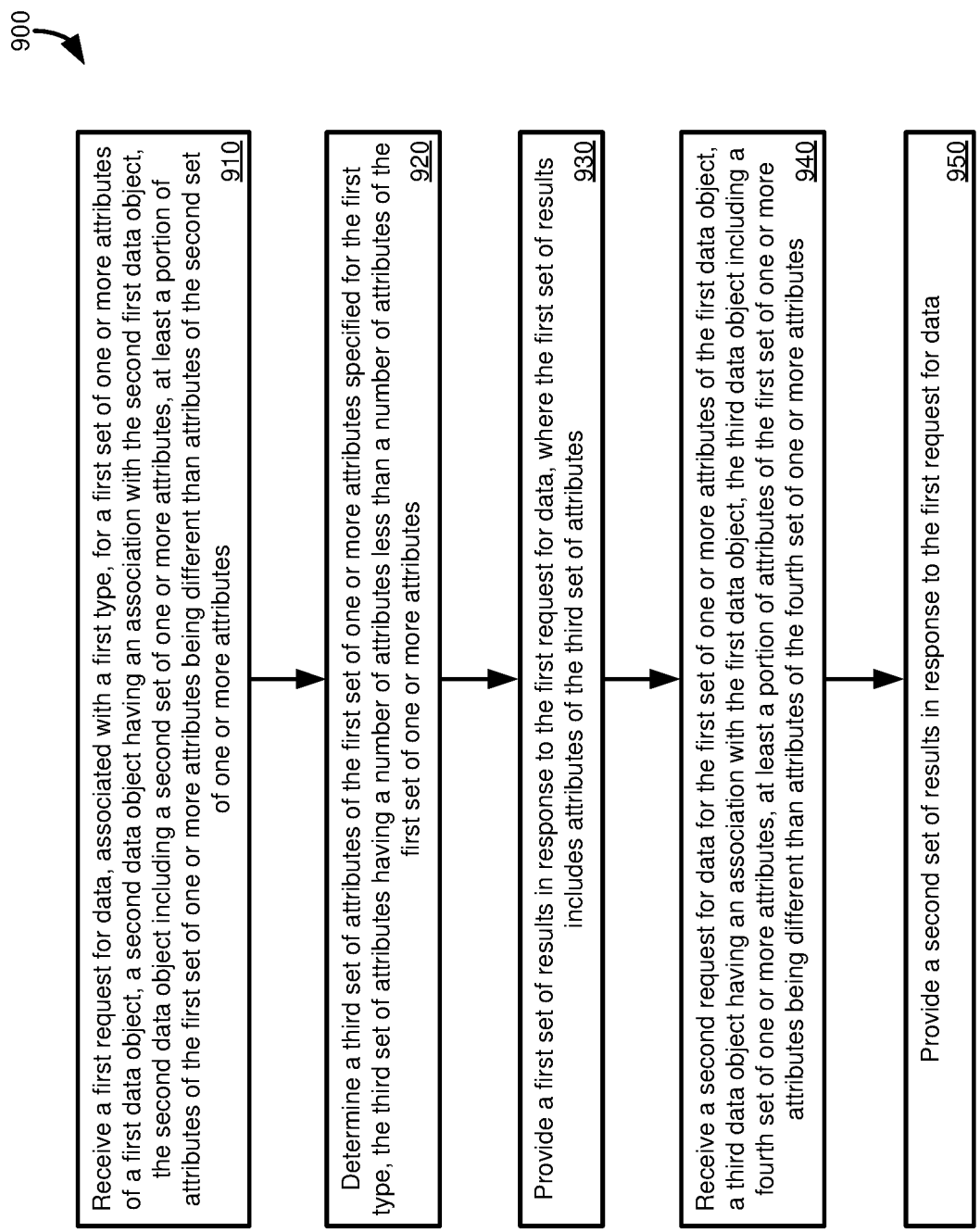
FIG. 9 is a flowchart of a process of retrieving data for second and third data objects from a first data object, where different sets of attributes of the first data object are retrieved.

FIG. 9 provides a flowchart of a method 900 of retrieving attributes from a supplemental data object. For example, the supplemental data object can be a localization table that includes localization attributes that supplement attributes of a data object in a core data model.

A first request for data, associated with a first type, is received for a first set of one or more attributes of a first data object at 910. A second data object has an association with the first data object. The second data object includes a second set of one or more attributes. At least a portion of attributes of the first set of one or more attributes are different than attributes of the second set of one or more attributes.

At 920, a third set of attributes of the first set of one or more attributes are determined that are specified for the first type. The third set of attributes has a number of attributes less than a number of attributes of the first set of one or more attributes. A first set of results are provided at 930 in response to the first request for data, where the first set of results includes attributes of the third set of attributes.

A second request for data for the first set of one or more attributes of the first data object is received at 940. A third data object has an association with the first data object. The third data object includes a fourth set of one or more attributes. At least a portion of attributes of the first set of one or more attributes are different than attributes of the fourth set of one or more attributes. At 950, a second set of results is provided in response to the second request for data.

Example 10—Computing Systems

Figure 10:
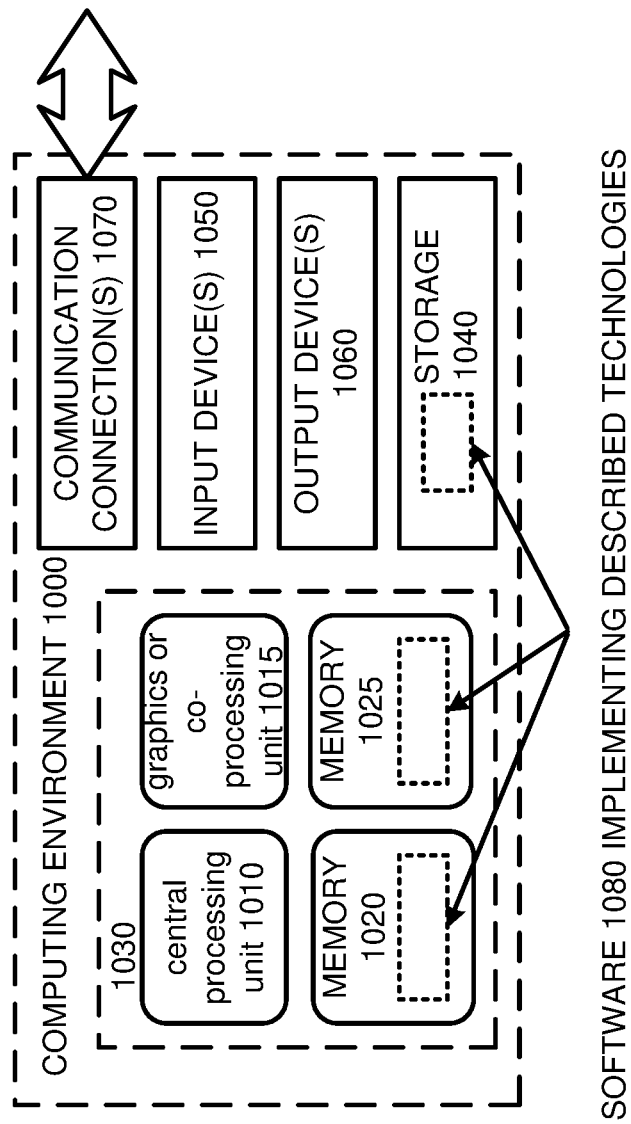
FIG. 10 is a diagram of an example computing system in which some described embodiments can be implemented.

FIG. 10 depicts a generalized example of a suitable computing system 1000 in which the described innovations may be implemented. The computing system 1000 is not intended to suggest any limitation as to scope of use or functionality of the present disclosure, as the innovations may be implemented in diverse general-purpose or special-purpose computing systems.

With reference to FIG. 10, the computing system 1000 includes one or more processing units 1010, 1015 and memory 1020, 1025. In FIG. 10, this basic configuration 1030 is included within a dashed line. The processing units 1010, 1015 execute computer-executable instructions, such as for implementing components of the processes of the present disclosure. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 10 shows a central processing unit 1010 as well as a graphics processing unit or co-processing unit 1015. The tangible memory 1020, 1025 may be volatile memory (e.g., registers, cache, RAM), non-volatile memory (e.g., ROM, EEPROM, flash memory, etc.), or some combination of the two, accessible by the processing unit(s) 1010, 1015. The memory 1020, 1025 stores software 1080 implementing one or more innovations described herein, in the form of computer-executable instructions suitable for execution by the processing unit(s) 1010, 1015. The memory 1020, 1025, may also store settings or settings characteristics, databases, data sets, interfaces, displays, object instances, or model.

A computing system 1000 may have additional features. For example, the computing system 1000 includes storage 1040, one or more input devices 1050, one or more output devices 1060, and one or more communication connections 1070. An interconnection mechanism (not shown) such as a bus, controller, or network interconnects the components of the computing system 1000. Typically, operating system software (not shown) provides an operating environment for other software executing in the computing system 1000, and coordinates activities of the components of the computing system 1000.

The tangible storage 1040 may be removable or non-removable, and includes magnetic disks, magnetic tapes or cassettes, CD-ROMs, DVDs, or any other medium which can be used to store information in a non-transitory way, and which can be accessed within the computing system 1000. The storage 1040 stores instructions for the software 1080 implementing one or more innovations described herein.

The input device(s) 1050 may be a touch input device such as a keyboard, mouse, pen, or trackball, a voice input device, a scanning device, or another device that provides input to the computing system 1000. The output device(s) 1060 may be a display, printer, speaker, CD-writer, or another device that provides output from the computing system 1000.

The communication connection(s) 1070 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules or components include routines, programs, libraries, objects, classes, components, data structures, etc., that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

In various examples described herein, a module (e.g., component or engine) can be "coded" to perform certain operations or provide certain functionality, indicating that computer-executable instructions for the module can be executed to perform such operations, cause such operations to be performed, or to otherwise provide such functionality. Although functionality described with respect to a software component, module, or engine can be carried out as a discrete software unit (e.g., program, function, class method), it need not be implemented as a discrete unit. That is, the functionality can be incorporated into a larger or more general-purpose program, such as one or more lines of code in a larger or general-purpose program.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 11—Cloud Computing Environment

Figure 11:
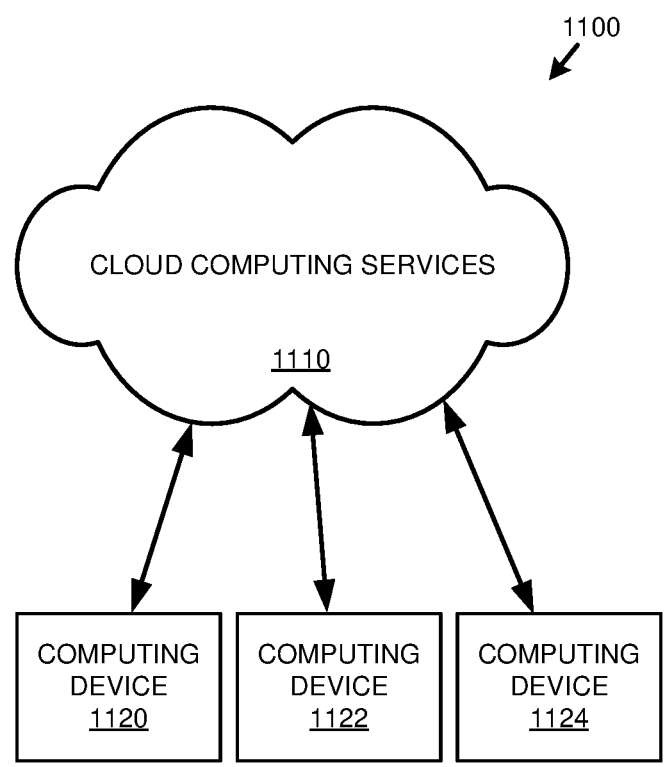
FIG. 11 is an example cloud computing environment that can be used in conjunction with the technologies described herein.

FIG. 11 depicts an example cloud computing environment 1100 in which the described technologies can be implemented. The cloud computing environment 1100 comprises cloud computing services 1110. The cloud computing services 1110 can comprise various types of cloud computing resources, such as computer servers, data storage repositories, networking resources, etc. The cloud computing services 1110 can be centrally located (e.g., provided by a data center of a business or organization) or distributed (e.g., provided by various computing resources located at different locations, such as different data centers and/or located in different cities or countries).

The cloud computing services 1110 are utilized by various types of computing devices (e.g., client computing devices), such as computing devices 1120, 1122, and 1124. For example, the computing devices (e.g., 1120, 1122, and 1124) can be computers (e.g., desktop or laptop computers), mobile devices (e.g., tablet computers or smart phones), or other types of computing devices. For example, the computing devices (e.g., 1120, 1122, and 1124) can utilize the cloud computing services 1110 to perform computing operations (e.g., data processing, data storage, and the like).

Example 12—Implementations

Although the operations of some of the disclosed methods are described in a particular, sequential order for convenient presentation, it should be understood that this manner of description encompasses rearrangement, unless a particular ordering is required by specific language set forth. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media, such as tangible, non-transitory computer-readable storage media, and executed on a computing device (e.g., any available computing device, including smart phones or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example, and with reference to FIG. 10, computer-readable storage media include memory 1020 and 1025, and storage 1040. The term computer-readable storage media does not include signals and carrier waves. In addition, the term computer-readable storage media does not include communication connections (e.g., 1070).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. It should be understood that the disclosed technology is not limited to any specific computer language or program. For instance, the disclosed technology can be implemented by software written in C++, Java, Perl, JavaScript, Python, Ruby, ABAP, SQL, Adobe Flash, or any other suitable programming language, or, in some examples, markup languages such as html or XML, or combinations of suitable programming languages and markup languages. Likewise, the disclosed technology is not limited to any particular computer or type of hardware.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present, or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A computing system comprising:
   at least one hardware processor;
   at least one memory coupled to the at least one hardware processor; and
   one or more computer-readable storage media storing computer-executable instructions that, when executed, cause the computing system to perform operations comprising:
   receiving a first query for a first data object, the first data object comprising values for attributes of a first set of one or more attributes defined for the first data object and an association with a second data object comprising a second set of a plurality of attributes comprising a third set of supplemental attributes for the first data object and a fourth set of supplemental attributes for a third data object comprising a fourth set of one or more attributes defined for the third data object, where the third set and the fourth set differ at least in part and have a number of attributes that is less than a number of attributes of the second set;
   determining a first set of one or more attribute values for at least a portion of attributes of the first set of one or more attributes that are responsive to the first query;
   determining that the first query is associated with a first value of a type identifier;
   with the first value of the type identifier, executing a second query on a fourth data object to identify the third set of supplemental attributes and returning identifiers of attributes of the third set in response to the second query;
   in executing the first query, sending a third query to the second data object, the third query comprising at least a portion of the attributes of the third set returned by the second query;
   in response to the third query, receiving a second set of one or more attribute values for at least a portion of attributes of the third set;
   providing a first set of results in response to the first query, wherein the first set of results comprises the first set of one or more attribute values and the second set of one or more attribute values;
   receiving a fourth query for the third data object
   determining a third set of one or more attribute values for at least a portion of attributes of the fourth set of one or more attributes that are responsive to the fourth query;
   determining that the fourth query is associated with a second value of the type identifier, the second value of the type identifier being different than the first value of the type identifier;
   with the second value of the type identifier, executing a fifth query on the fourth data object to identify the fourth set of supplemental attributes and returning identifiers of attributes of the fourth set in response to the fifth query;
   in executing the fourth query, sending a sixth query to the second data object, the fourth query comprising at least a portion a portion of the attributes of the fourth set returned by the fifth query;
   in response to the sixth query, receiving a fourth set of one or more attribute values for at least a portion of attributes of the fourth set; and
   providing a second set of results in response to the fourth query wherein the second set of results comprises the third set of one or more attribute values and the fourth set of one or more attribute values.

2. The computing system of claim 1, wherein the first data object is part of a core data model and the second data object is part of a supplemental data model that supplements the core data model.

3. The computing system of claim 2, wherein the supplemental data model provides localization attributes for one or more data objects of the core data model and at least a portion of the localization attributes are defined in the first data object.

4. The computing system of claim 2, wherein the supplemental data model provides localization attributes for one or more data objects of the core data model and all of the localization attributes are defined in the second data object.

5. The computing system of claim 1, wherein the second data object comprises a plurality of key attributes and the third query comprises a first set of key attributes of the plurality of key attributes and the sixth query comprises a second set of key attributes of the plurality of key attributes, wherein at least one key attribute of the second set of key attributes is different than key attributes of the first set of key attributes.

6. The computing system of claim 1, wherein the first value of the type identifier is specified in a definition of the first data object.

7. The computing system of claim 1, wherein the first set of results does not include attributes of the first set of one or more attributes that are not comprised within the third set of supplemental attributes.

8. The computing system of claim 1, wherein the first value of the type identifier is specified in a definition of the first data object and the second value of the type identifier is specified in the definition of the third data object.

9. The computing system of claim 1, wherein the association between the first data object and the second data object is specified in a definition of the first data object and the association between the second data object and the third data object is specified in a definition of the third data object.

10. The computing system of claim 1, wherein the first data object and the third data object are part of a document defined with reference to a plurality of data objects.

11. The computing system of claim 1, wherein the first data object is part of a first document defined with respect to a first plurality of data objects and the third data object is part of a second document defined with respect to a second plurality of data objects, wherein at least one data object differs between the first plurality of data objects and the second plurality of data objects.

12. The computing system of claim 1, wherein the first query and the fourth query are processed using an interface class instance, the interface class instance retrieving data from the second data object.

13. The computing system of claim 12, wherein the interface class instance is implemented using a singleton pattern.

14. The computing system of claim 12, wherein providing the first set of results and providing the second set of results comprising storing the first set of results and the second set of results in the interface class instance.

15. The computing system of claim 14, the operations further comprising:

receiving a request to modify data stored in the interface class instance;

modifying data stored in the interface class instance to provide modified data;

receiving a request to persist the modified data; and in response to the request to persist the modified data storing the modified data in the first data object, wherein the modified data is not stored in the first data object unless the request to persist the modified data is provided.

16. A method, implemented in a computing system comprising at least one hardware processor and at least one memory coupled to the at least one hardware processor, the method comprising:

receiving a first query for a first data object, the first data object comprising values for attributes of a first set of one or more attributes defined for the first data object and an association with a second data object comprising a second set of a plurality of attributes comprising a third set of supplemental attributes for the first data object and a fourth set of supplemental attributes for a third data object comprising a fourth set of one or more attributes defined for the third data object, where the third set and the fourth set differ at least in part and have a number of attributes that is less than a number of attributes of the second set;

determining a first set of one or more attribute values for at least a portion of attributes of the first set of one or more attributes that are responsive to the first query;

determining that the first query is associated with a first value of a type identifier;

with the first value of the type identifier, executing a second query on a fourth data object to identify the third set of supplemental attributes and returning identifiers of attributes of the third set in response to the second query;

in executing the first query, sending a third query to the second data object, the third query comprising at least a portion of the attributes of the third set returned by the second query;

in response to the third query, receiving a second set of one or more attribute values for at least a portion of attributes of the third set providing a first set of results in response to the first query, wherein the first set of results comprises the first set of one or more attribute values and the second set of one or more attribute values;

receiving a fourth query for the third data object determining a third set of one or more attribute values for at least a portion of attributes of the fourth set of one or more attributes that are responsive to the fourth query;

determining that the fourth query is associated with a second value of the type identifier, the second value of the type identifier being different than the first value of the type identifier;

with the second value of the type identifier, executing a fifth query on the fourth data object to identify the fourth set of supplemental attributes and returning identifiers of attributes of the fourth set in response to the fifth query;

in executing the fourth query, sending a sixth query to the second data object, the fourth query comprising at least a portion a portion of the attributes of the fourth set returned by the fifth query;

in response to the sixth query, receiving a fourth set of one or more attribute values for at least a portion of attributes of the fourth set; and providing a second set of results in response to the fourth query wherein the second set of results comprises the third set of one or more attribute values and the fourth set of one or more attribute values.

17. The method of claim 16, wherein the first value of the type identifier is specified in a definition of the first data object.

18. The method of claim 16, wherein the first query and the fourth query are processed using an interface class instance, the interface class instance retrieving data from the second data object and being implemented using a singleton pattern.

19. One or more non-transitory computer-readable storage media comprising:

computer-executable instructions that, when executed by a computing system comprising at least one hardware processor and at least one memory coupled to the at least one hardware processor, cause the computing system to receive a first query for a first data object, the first data object comprising values for attributes of a first set of one or more attributes defined for the first data object and an association with a second data object comprising a second set of a plurality of attributes comprising a third set of supplemental attributes for the first data object and a fourth set of supplemental attributes for a third data object comprising a fourth set of one or more attributes defined for the third data object, where the third set and the fourth set differ at least in part and have a number of attributes that is less than a number of attributes of the second set;

computer-executable instructions that, when executed by the computing system, cause the computing system to determine a first set of one or more attribute values for at least a portion of attributes of the first set of one or more attributes that are responsive to the first query;

computer-executable instructions that, when executed by the computing system, cause the computing system to determine that the first query is associated with a first value of a type identifier;

computer-executable instructions that, when executed by the computing system, cause the computing system to with the first value of the type identifier, execute a second query on a fourth data object to identify the third set of supplemental attributes and returning identifiers of attributes of the third set in response to the second query;

computer-executable instructions that, when executed by the computing system, cause the computing system to, in executing the first query, send a third query to the second data object, the third query comprising at least a portion of the attributes of the third set returned by the second query;

computer-executable instructions that, when executed by the computing system, cause the computing system to, in response to the third query, receive a second set of one or more attribute values for at least a portion of attributes of the third set computer-executable instructions that, when executed by the computing system, cause the computing system to provide a first set of results in response to the first query, wherein the first set of results comprises the first set of one or more attribute values and the second set of one or more attribute values;

computer-executable instructions that, when executed by the computing system, cause the computing system to receive a fourth query for the third data object computer-executable instructions that, when executed by the computing system, cause the computing system to determine a third set of one or more attribute values for at least a portion of attributes of the fourth set of one or more attributes that are responsive to the fourth query;

computer-executable instructions that, when executed by the computing system, cause the computing system to determine that the fourth query is associated with a second value of the type identifier, the second value of the type identifier being different than the first value of the type identifier;

computer-executable instructions that, when executed by the computing system, cause the computing system to, with the second value of the type identifier, execute a fifth query on the fourth data object to identify the fourth set of supplemental attributes and returning identifiers of attributes of the fourth set in response to the fifth query;

computer-executable instructions that, when executed by the computing system, cause the computing system to, in executing the fourth query, send a sixth query to the second data object, the fourth query comprising at least a portion a portion of the attributes of the fourth set returned by the fifth query;

computer-executable instructions that, when executed by the computing system, cause the computing system to, in response to the sixth query, receive a fourth set of one or more attribute values for at least a portion of attributes of the fourth set; and computer-executable instructions that, when executed by the computing system, cause the computing system to provide a second set of results in response to the fourth query wherein the second set of results comprises the third set of one or more attribute values and the fourth set of one or more attribute values.

20. The one more non-transitory computer-readable storage media of claim 19, wherein the first value of the type identifier is specified in a definition of the first data object.

* * * * *